(12) United States Patent
Cheng et al.

(10) Patent No.: US 11,132,114 B2
(45) Date of Patent: Sep. 28, 2021

(54) METHOD AND APPARATUS FOR GENERATING CUSTOMIZED VISUALIZATION COMPONENT

(71) Applicant: BEIJING BAIDU NETCOM SCIENCE AND TECHNOLOGY CO., LTD., Beijing (CN)

(72) Inventors: Rong Cheng, Beijing (CN); Yu Hao, Beijing (CN); Muwei Zhao, Beijing (CN); Ziyan Zhong, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 68 days.

(21) Appl. No.: 16/503,153

(22) Filed: Jul. 3, 2019

(65) Prior Publication Data

US 2020/0057550 A1 Feb. 20, 2020

(30) Foreign Application Priority Data

Aug. 20, 2018 (CN) .......................... 201810947881.6

(51) Int. Cl.
*G06F 16/9038* (2019.01)
*G06F 3/0484* (2013.01)
*G06F 3/0482* (2013.01)
*G06F 3/0483* (2013.01)
*G06F 21/31* (2013.01)

(52) U.S. Cl.
CPC ........ *G06F 3/04845* (2013.01); *G06F 3/0482* (2013.01); *G06F 3/0483* (2013.01); *G06F 21/31* (2013.01)

(58) Field of Classification Search
None
See application file for complete search history.

(56) References Cited

U.S. PATENT DOCUMENTS

| | | | |
|---|---|---|---|
| 10,366,157 B2* | 7/2019 | Campbell | G06T 11/60 |
| 10,606,872 B1* | 3/2020 | Shelton | G06F 16/24578 |
| 2010/0023868 A1* | 1/2010 | Bonforte | G06Q 10/00 |
| | | | 715/738 |
| 2016/0092530 A1* | 3/2016 | Jakubiak | G06F 16/26 |
| | | | 715/202 |
| 2016/0171764 A1* | 6/2016 | Chew | G06T 17/20 |
| | | | 345/423 |

(Continued)

*Primary Examiner* — Henry Orr
(74) *Attorney, Agent, or Firm* — Seed IP Law Group LLP (57) ABSTRACT

Embodiments of the present disclosure presents a method and apparatus for generating a customized visualization component. A specific embodiment of the method comprises: determining, in response to receiving a creation instruction for instructing to create a customized visualization component, a visualization instance presented on a current component editing page based on the received creation instruction; determining an initial visualization component corresponding to the visualization instance and a user setting parameter set by a user for the visualization instance; and uploading a creation request for the customized visualization component to a server to enable the server to generate the customized visualization component based on the initial visualization component and the user setting parameter, the creation request including identifier information of the initial visualization component and the user setting parameter.

9 Claims, 5 Drawing Sheets

(56) References Cited

U.S. PATENT DOCUMENTS

2016/0231915 A1* 8/2016 Nhan .................... G06F 16/904
2017/0041296 A1* 2/2017 Ford ................... H04L 63/0421
2018/0096052 A1* 4/2018 M ......................... G06F 3/0481
2018/0121035 A1* 5/2018 Filippi ............... G06F 3/04847
2019/0026082 A1* 1/2019 Shalev ................. G06F 40/186

* cited by examiner

METHOD AND APPARATUS FOR GENERATING CUSTOMIZED VISUALIZATION COMPONENT

CROSS-REFERENCE TO RELATED APPLICATIONS

This application claims priority to Chinese Application No. 201810947881.6, filed on Aug. 20, 2018 and entitled "Method and Apparatus for Generating Customized Visualization Component," the entire disclosure of which is hereby incorporated by reference.

TECHNICAL FIELD

Embodiments of the present disclosure relate to the technical field of computers, specifically to the technical field of computer networks, and more specifically to a method and apparatus for generating a customized visualization component.

BACKGROUND

The data visualization means a process of converting, using computer graphics and image processing techniques, data in large data sets into graphics or images, displaying the graphics or images on a screen, and discovering unknown information therein using data analysis and development tools.

The currently developing online data visual editing tool facilitates online visualized analysis and processing of massive information data by different users. For example, a user adds a preset visualization component in the data visual editing tool to organize his own report form. The preset visualization component is generally programmed and implemented by the developer of the data visual editing tool.

The user generally has customization requirements when generating a data visualization report form using the visualization component. That is, a visualization instance in the visualization report form is displayed based on the user's requirements and styles.

SUMMARY

Embodiments of the present disclosure presents a method and apparatus for generating a customized visualization component.

In a first aspect, an embodiment of the present disclosure provides a method for generating a customized visualization component, including: determining, in response to receiving a creation instruction for instructing to create a customized visualization component, a visualization instance presented on a current component editing page based on the received creation instruction; determining an initial visualization component corresponding to the visualization instance and a user setting parameter set by a user for the visualization instance; and uploading a creation request for the customized visualization component to a server to enable the server to generate the customized visualization component based on the initial visualization component and the user setting parameter, the creation request including identifier information of the initial visualization component and the user setting parameter.

In some embodiments, the visualization instance is a combination of visualization instances, the combination of visualization instances is formed by combining at least two visualization instances, and each of the visualization instances corresponds to an initial visualization component; the determining an initial visualization component corresponding to the visualization instance and a user setting parameter set by a user for the visualization instance includes: determining the initial visualization component and the user setting parameter corresponding to each of the at least two visualization component instances, and a relative positional relationship parameter of the at least two visualization instances; the creation request includes the identifier information of the initial visualization component and the user setting parameter corresponding to each of the at least two visualization instances, and the relative positional relationship parameter; and the uploading the creation request to a server to enable the server to generate the customized visualization component based on the initial visualization component and the user setting parameter includes: uploading the creation request to the server to enable the server to generate the customized visualization component based on the identifier information of the initial visualization component and the user setting parameter corresponding to each of the at least two visualization instances, and the relative positional relationship parameter.

In some embodiments, the determining an initial visualization component corresponding to the visualization instance and a user setting parameter set by a user for the visualization instance further includes: determining a hierarchical relationship parameter of the at least two visualization instances; the creation request further includes the hierarchical relationship parameter; and the uploading a creation request for the customized visualization component to a server to enable the server to generate the customized visualization component based on the initial visualization component and the user setting parameter includes: uploading the creation request for the customized visualization component to the server to enable the server to generate the customized visualization component based on the identifier information of the initial visualization component and the user setting parameter corresponding to each of the at least two visualization instances, the relative positional relationship parameter, and the hierarchical relationship parameter.

In some embodiments, the method further includes: receiving the customized visualization component created based on the creation request and sent by the server and the identifier information thereof; and presenting the customized visualization component in a component list displayed on the component editing page.

In some embodiments, the method further includes: sending, in response to receiving a sharing operation of a user on the customized visualization component, the sharing operation to the server to enable the server to share the customized visualization component to users instructed by the sharing operation.

In some embodiments, the method further includes: sending, in response to receiving the creation instruction for instructing to create the customized visualization component, user identifier information corresponding to the creation instruction to the server to enable the server to authenticate the user; and determining, in response to receiving information for instructing successful authentication sent by the server, the visualization instance presented on a current component editing page based on the received creation instruction.

In a second aspect, an embodiment of the present disclosure provides an apparatus for generating a customized visualization component, including: a first determining unit configured for determining, in response to receiving a creation instruction for instructing to create a customized visualization component, a visualization instance presented on a current component editing page based on the received creation instruction; a second determining unit configured for determining an initial visualization component corresponding to the visualization instance and a user setting parameter set by a user for the visualization instance; and a generating unit configured for uploading a creation request for the customized visualization component to a server to enable the server to generate the customized visualization component based on the initial visualization component and the user setting parameter, the creation request including identifier information of the initial visualization component and the user setting parameter.

In some embodiments, the visualization instance is a combination of visualization instances, the combination of visualization instances is formed by combining at least two visualization instances, each of the visualization instances corresponds to an initial visualization component; the second determining unit is further configured for: determining a relative positional relationship parameter of the at least two visualization instances; the creation request includes the identifier information of the initial visualization component and the user setting parameter corresponding to each of the at least two visualization instances, and the relative positional relationship parameter; and the generating unit is further configured for: uploading the creation request to the server to enable the server to generate the customized visualization component based on the identifier information of the initial visualization component and the user setting parameter corresponding to each of the at least two visualization instances, and the relative positional relationship parameter.

In some embodiments, the second determining unit is further configured for: determining a hierarchical relationship parameter of the at least two visualization instances; the creation request further includes the hierarchical relationship parameter; and the generating unit is further configured for: uploading the creation request to the server to enable the server to generate the customized visualization component based on the identifier information of the initial visualization component and the user setting parameter corresponding to each of the at least two visualization instances, the relative positional relationship parameter, and the hierarchical relationship parameter.

In some embodiments, the apparatus further includes: a receiving unit configured for: receiving the customized visualization component created based on the creation request and sent by the server and the identifier information thereof; and presenting the customized visualization component in a component list displayed on the component editing page.

In some embodiments, the apparatus further includes a sharing unit configured for: sending, in response to receiving a sharing operation of a user on the customized visualization component, the sharing operation to the server to enable the server to share the customized visualization component to users instructed by the sharing operation.

In some embodiments, the apparatus further includes an authenticating unit configured for: sending, in response to receiving the creation instruction for instructing to create the customized visualization component, user identifier information corresponding to the creation instruction to the server to enable the server to authenticate the user; and determining, in response to receiving information for instructing successful authentication sent by the server, the visualization instance presented on a current component editing page based on the received creation instruction.

In a third aspect, an embodiment of the present disclosure provides an electronic device, the electronic device includes: one or more processors; and a storage apparatus storing one or more programs therein, and the one or more programs, when executed by the one or more processors, cause the one or more processors to implement the method according to any one of the implementations in the first aspect.

In a fourth aspect, an embodiment of the present disclosure provides a computer readable medium storing a computer program therein, where the computer program, when executed by a processor, implements the method according to any one of the implementations in the first aspect.

The method and apparatus for generating a customized visualization component provided by embodiments of the present disclosure determine, in response to receiving a creation instruction for instructing to create a customized visualization component, a visualization instance presented on a current component editing page based on the received creation instruction, then determine an initial visualization component corresponding to the visualization instance and a user setting parameter set by a user for the visualization instance, and finally upload a creation request for the customized visualization component to a server to enable the server to generate the customized visualization component based on the initial visualization component and the user setting parameter, thereby generating the customized visualization component satisfying user demands, facilitating reducing the time spent by the user in generating a data visualization report form, and improving the user experience.

BRIEF DESCRIPTION OF THE DRAWINGS

By reading and referring to detailed description on the non-limiting embodiments in the following accompanying drawings, other features, objects and advantages of the disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
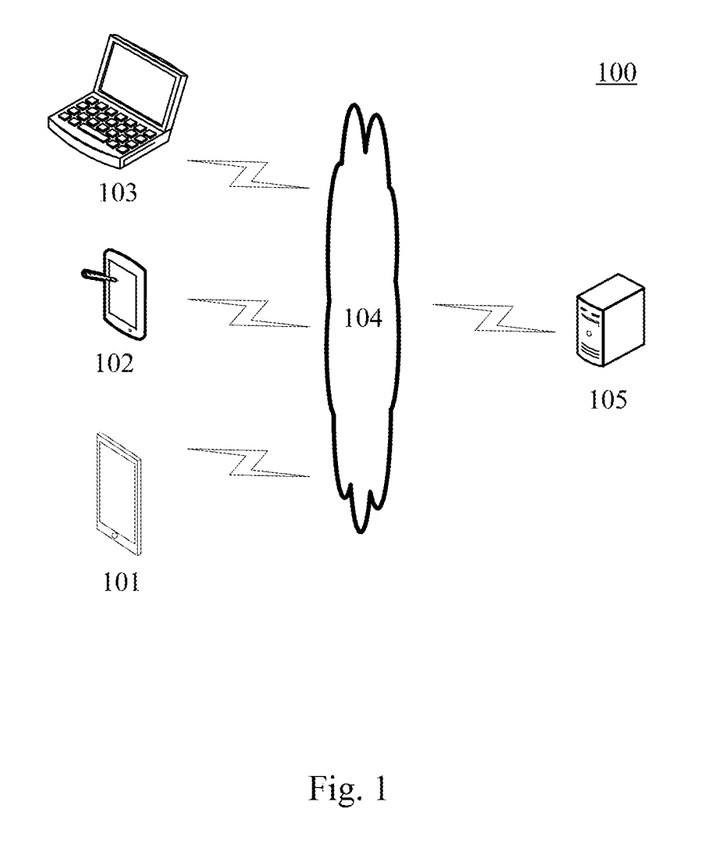
FIG. 1 is a diagram of an exemplary system architecture in which the method for generating a customized visualization component according to an embodiment of the present disclosure may be implemented.

FIG. 1 shows an exemplary system architecture 100 in which the method for generating a customized visualization component according to an embodiment of the present disclosure may be implemented.

As shown in FIG. 1, the system architecture 100 may include terminal devices 101, 102 and 103, a network 104, and a server 105. The network 104 serves as a medium providing a communication link between the terminal devices 101, 102 and 103, and the server 105. The network 104 may include various types of connections, such as a wired communication link, a wireless communication link, or a fiber cable.

A user may interact with the server 105 using the terminal devices 101, 102 and 103 through the network 104, to receive or send messages, etc. The terminal devices 101, 102 and 103 may be installed with various client applications, such as a web browser application, a shopping application, a search application, an instant messaging tool, a mailbox client, and social platform software.

The terminal devices 101, 102 and 103 may be hardware or software. When the terminal devices 101, 102 and 103 are hardware, the terminal devices may be various electronic devices having display screens and supporting web browsing, including but not limited to smart phones, tablet computers, e-book readers, laptop computers, desktop computers, or the like. When the terminal devices 101, 102 and 103 are software, the terminal devices may be installed in the above electronic devices. They may be implemented as a plurality of software packages or software modules (e.g., software or software modules for providing distributed services), or may be implemented as an individual software package or software module. This is not specifically limited herein.

The server 105 can provide various services, such as backend servers providing a support for web page contents displayed on the terminal devices 101, 102 and 103. The backend server can analyze and process page contents based on received user settings, and return the processing result (for example, the web page changed based on the user settings) to the terminal devices.

It should be noted that the method for generating a customized visualization component according to an embodiment of the present disclosure is generally executed by the terminal devices 101, 102 and 103. Accordingly, the apparatus for generating a customized visualization component is generally installed on the terminal devices 101, 102 and 103.

It should be noted that the server may be hardware or software. When the server is hardware, the server may be implemented as a distributed server cluster including a plurality of servers, or may be implemented as a single server. When the server is software, the server may be implemented as a plurality of software packages or software modules (e.g., software or software modules for providing distributed services), or may be implemented as an individual software package or software module. This is not specifically limited herein.

It should be understood that the number of the terminal devices, the number of the networks, and the number of the servers in FIG. 1 are only illustrative. Any number of terminal devices, networks and servers may be provided based on the actual requirements.

Figure 2:
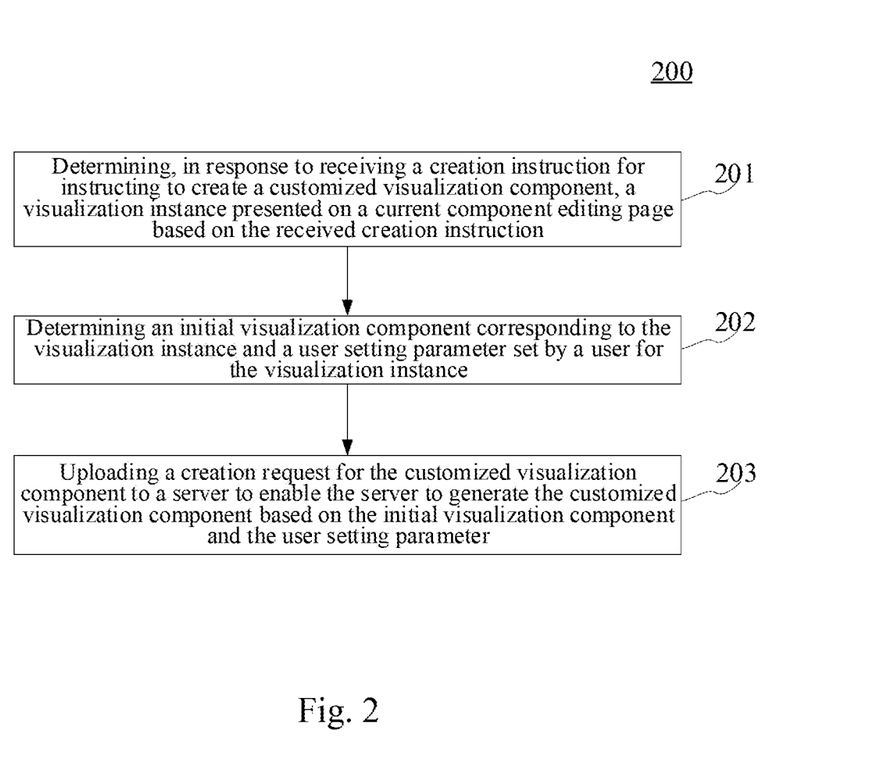
FIG. 2 is a flowchart of an embodiment of the method for generating a customized visualization component according to the present disclosure.

Further referring to FIG. 2, a flow 200 of an embodiment of the method for generating a customized visualization component according to the present disclosure is shown. The method for generating a customized visualization component includes the following steps.

Step 201, determining, in response to receiving a creation instruction for instructing to create a customized visualization component, a visualization instance presented on a current component editing page based on the received creation instruction.

In this embodiment, a user can have access to a data visual editing tool on a server (e.g., the server 105 shown in FIG. 1) through a browser running on a terminal device. The above data visual editing tool can provide a plurality of visualization components. The user can edit the visualization components on the component editing page provided by the data visual editing tool, and bind to to-be-analyzed data, thereby generating a data visualization report form for analyzing the data by the user. The data herein refer to data in a broad sense, including texts, pictures, voices, and other hypermedia data sets. The types of the above data sets may include table data, network data, field data, and spatial data. Sets, lists, or the like are also commonly used data set types.

When the user has access to the data visual editing tool, a relevant page, e.g., the component editing page, of the visual editing tool can be displayed on the browser of the terminal device. The user can perform operations, such as selection or dragging, on the visualization component on the page, to present the selected visualization component on canvas to form a corresponding visualization instance. Then, the user can set parameters for attributes of the visualization instance. The attributes of the visualization instance herein may include, e.g., line color, line width, or line display style of the visualization instance contour, size, shape, coordinates, or background of the visualization instance, or the like.

In this embodiment, the visualization component provided by the data visual editing tool can be considered as an initial visualization component.

The initial visualization component is generally edited and generated by the developer of the data visual editing tool using a program code. The initial visualization component has preset attributes, such as size, color, and display style.

However, when generating the data visualization report form, the user is likely to expect to configure the visualization instance of an initial visualization component according to his own habits and hobbies. Moreover, the user is also likely to expect to repeatedly use the visualization instance of the initial visualization component configured according to his own habits and hobbies in the data visualization report form. Or, the user expects to continue using the visualization instance of the initial visualization component configured according to his own habits and hobbies when making the data visualization report form next time.

A customized visualization component can be generated following the method provided in the present disclosure, in order to facilitate repeatedly using the visualization instance of the initial visualization component configured by the user according to his own habits and hobbies in a given data visualization report form by the user, or reusing the visualization instance of the initial visualization component configured according to the habits and hobbies of the user when making a data visualization report form in the future.

In this embodiment, the terminal device can display a control for instructing to generate the customized visualization component on the component editing page of the data visual editing tool.

The user can perform operations, e.g., clicking, on the control, thereby sending a creation instruction for creating the customized visualization component to the terminal device.

In this embodiment, an executive body (e.g., the terminal device as shown in FIG. 1) of the method for generating a customized visualization component determines, in response to receiving a creation instruction for instructing to create a customized visualization component, a visualization instance presented on a current component editing page based on the received creation instruction.

The creation instruction for instructing to create a customized visualization component can be considered as a creation instruction generated by the user executing an operation, e.g., clicking, on the control for instructing to generate a customized visualization component on the current component editing page.

The creation instruction for instructing to create a customized visualization component can trigger the executive body to determine a visualization instance corresponding to the creation instruction and presented on the current component editing page.

Step 202, determining an initial visualization component corresponding to the visualization instance and a user setting parameter set by a user for the visualization instance.

In this embodiment, the executive body can determine an initial visualization component corresponding to the visualization instance and a user setting parameter set by a user for the visualization instance based on the visualization instance determined in Step 201.

The executive body can determine the initial visualization component corresponding to the visualization instance determined in Step 201 based on the corresponding relationship between the component and the instance. It can be understood that the initial visualization component herein may be various types of visualization components, e.g.: chart visualization components, such as histograms, area charts, line charts, pie charts, and Nightingale rose diagram; map visualization components, such as device maps, vehicle networking location maps, and vehicle networking trajectory maps; general visualization components, such as clocks, labels, and scoreboards; and graphical visualization components, such as arrows, straight lines, triangles, polygons, and circles.

Furthermore, the executive body can further read the user setting parameter set by the user for the visualization instance on the current component editing page.

Step 203, uploading a creation request for the customized visualization component to a server to enable the server to generate the customized visualization component based on the initial visualization component and the user setting parameter.

In this embodiment, the executive body can generate a creation request for the customized visualization component based on the initial visualization component corresponding to the visualization instance and the user setting parameter determined in Step 202. The creation request can include the initial visualization component corresponding to the visualization instance and the user setting parameter.

The executive body of the method for generating a customized visualization component can upload a creation request for the customized visualization component to the server (e.g., the server as shown in FIG. 1) to enable the server to generate the customized visualization component based on the initial visualization component and the user setting parameter.

After receiving the creation request, the server can set parameters for attributes of the initial visualization component corresponding to the visualization instance based on the user setting parameter, thereby generating the customized visualization component. The server can further prompt the user by the terminal device to input information, such as name, and icon, that can characterize identity of the customized visualization component, so that the user can subsequently find the customized visualization component based on the name and icon. Furthermore, the server can further generate an identifier of the customized visualization component. The identifier of the customized visualization component herein may be an identifier used by the server and the terminal device for distinguishing between different visualization components. The identifier may be a number, a text, a character, a symbol, or the like, or may be a combination of the number, the text, the character, the symbol, or the like.

Furthermore, the server can further use the initial visualization component as a basic component of the customized visualization component. Thus, the user can confirm functions of the customized visualization component according to the basic component.

The server can store the customized visualization component to a repository or database of visualization components.

Figure 3:
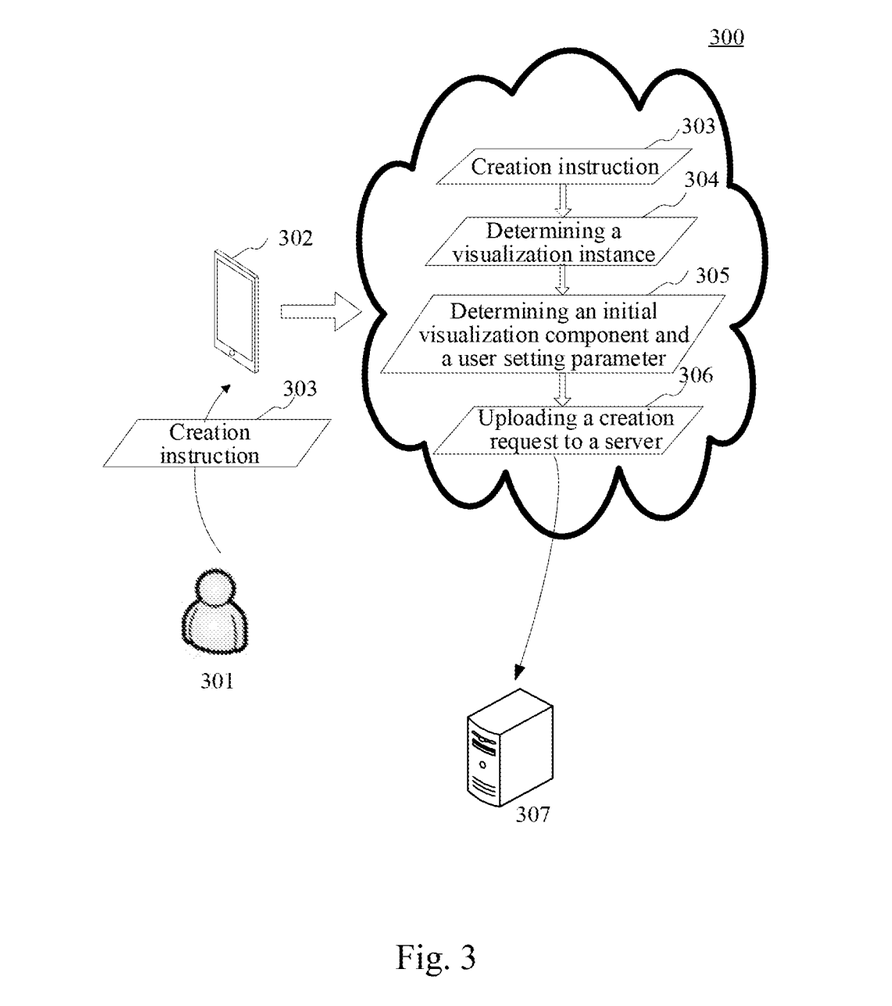
FIG. 3 is a schematic diagram of an application scenario of the method for generating a customized visualization component according to the present disclosure.

Further referring to FIG. 3, FIG. 3 is a schematic diagram 300 of an application scenario of the method for generating a customized visualization component according to this embodiment. In the application scenario of FIG. 3, a user 301 first sends a creation instruction 303 for instructing to create a customized visualization component to a terminal device 302. The terminal device 302 determines, in response to receiving the creation instruction 303 for instructing to create a customized visualization component, a visualization instance 304 presented on a current component editing page based on the received creation instruction. Then, the terminal device 302 determines an initial visualization component corresponding to the visualization instance and a user setting parameter 305 set by the user for the visualization instance. Finally, the terminal device 302 generates a creation request, the creation request includes identifier information of the initial visualization component and the user setting parameter of the visualization instance, and the terminal device 302 uploads the creation request to a server 307 to enable the server 307 to generate the customized visualization component 306 based on the initial visualization component and the user setting parameter.

The method according to the above embodiments of the present disclosure determines, in response to receiving a creation instruction for instructing to create a customized visualization component, a visualization instance presented on a current component editing page based on the received creation instruction, then determines an initial visualization component corresponding to the visualization instance and a user setting parameter set by a user for the visualization instance, and finally uploads a creation request for the customized visualization component to a server to enable the server to generate the customized visualization component based on the initial visualization component and the user setting parameter, thereby generating the customized visualization component satisfying user demands, improving the user experience, and providing convenience for the user to make a data visualization report form satisfying user demands and styles. Furthermore, when subsequently making the data visualization report form, the user can directly use the customized visualization component without the need for reediting the initial visualization component, thereby saving the time spent by the user in generating the data visualization report form.

In some optional implementations of the embodiment, the executive body for generating a customized visualization component can further receive the customized visualization component created based on the creation request and sent by the server and identifier information of the customized visualization component. The identifier information includes an identifier of the customized visualization component. The identifier of the customized visualization component herein may be used for distinguishing between different visualization components. The identifier may be a number, a text, a character, a symbol, or the like, or may be a combination of the number, the text, the character, the symbol, or the like. The rules for setting the identifier of the customized visualization component may be identical to, or different from, the rules for setting the identifier of the initial visualization component.

The executive body can present the customized visualization component in a component list displayed on the component editing page. In some application scenarios, the executive body can display the customized visualization component on the component editing page currently displayed by the browser window of the executive body. In some application scenarios, the executive body can display the customized visualization component when the user opens the component editing page through the browser next time.

The customized visualization component created by the server based on the creation request is displayed on the component editing page to enable the user to generate a visualized data report form satisfying user demands and styles using the customized visualization component, thereby saving the time spent by the user in generating the data visualization report form satisfying user demands and styles, and improving the user experience.

In some optional implementations of the embodiment, the executive body for generating the customized visualization component can further send, in response to receiving a sharing operation executed by a user on the customized visualization component, the sharing operation to the server to enable the server to share the customized visualization component to users instructed by the sharing operation.

In these optional implementations, the user can execute a sharing operation of sharing the customized visualization component on a component management page displayed by the executive body. The sharing operation can instruct at least one user. The sharing operation herein may include, for example, operations such as the user inputting specified to-be-shared users in a to-be-shared user list by clicking a sharing control on the component management page.

The server can share the customized visualization component to users instructed by the sharing operation based on the sharing operation.

Figure 4:
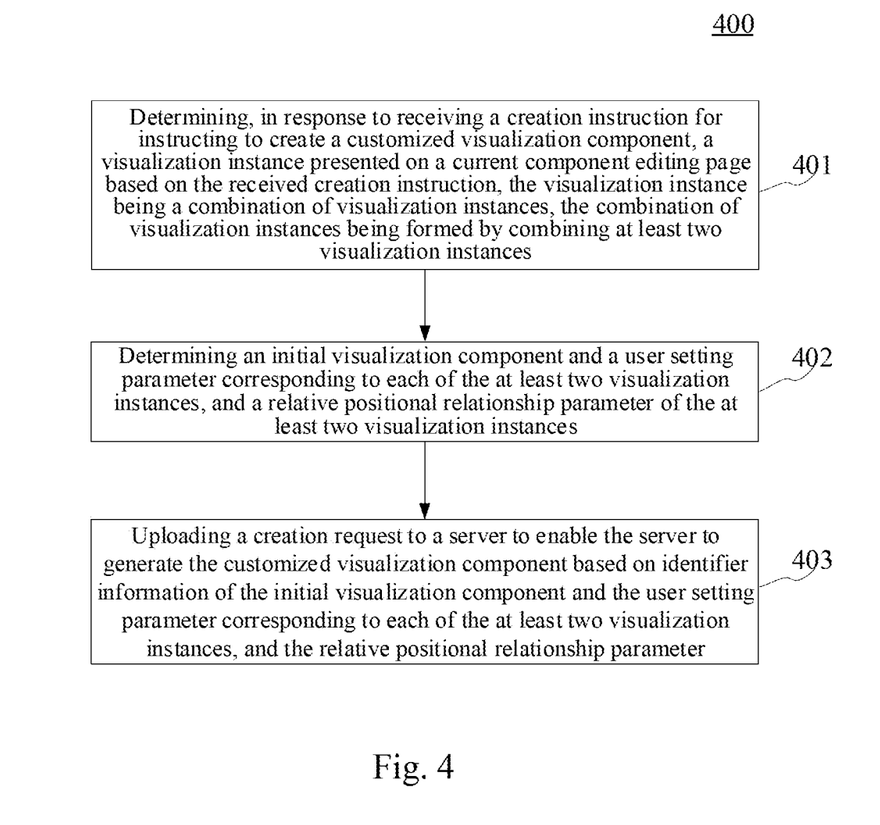
FIG. 4 is a flowchart of another embodiment of the method for generating a customized visualization component according to the present disclosure.

Further referring to FIG. 4, a flow 400 of another embodiment of the method for generating a customized visualization component is shown. The flow 400 of the method for generating a customized visualization component includes the following steps.

Step 401, determining, in response to receiving a creation instruction for instructing to create a customized visualization component, a visualization instance presented on a current component editing page based on the received creation instruction, the visualization instance being a combination of visualization instances, the combination of visualization instances being formed by combining at least two visualization instances.

The executive body can determine, in response to receiving a creation instruction for instructing to create a customized visualization component, a visualization instance presented on a current component editing page based on the received creation instruction. The visualization instance is a combination of visualization instances, and the combination of visualization instances is formed by combining at least two visualization instances. Each visualization instance may correspond to an initial visualization component.

In this embodiment, the user can combine at least two visualization instances on the component editing page, to generate a combination of visualization instances. Among the at least two visualization instances included in the combination of visualization instances, each visualization instance may correspond to an initial visualization component. When combining the at least two visualization instances, the user configures a relative positional relationship of the at least two visualization instances, and can set a user setting parameter for each of the visualization instances. Here, the terminal device can record a relative positional relationship parameter of each of the at least two visualization instances.

Step 402, determining the initial visualization component and the user setting parameter corresponding to each of the at least two visualization instances, and a relative positional relationship parameter of the at least two visualization instances.

In this embodiment, the visualization instance determined in Step 401 is a combination of visualization instances. The executive body can determine the initial visualization component and the user setting parameter corresponding to each of the at least two visualization instances included in the combination of visualization instances, and the relative positional relationship parameter of the at least two visualization instances.

Step 403, uploading a creation request to a server to enable the server to generate the customized visualization component based on the identifier information of the initial visualization component and the user setting parameter corresponding to each of the at least two visualization instances, and the relative positional relationship parameter.

In this embodiment, the executive body can first generate a creation request. The creation request includes identifier information of the initial visualization component and the user setting parameter corresponding to each of the at least two visualization instances, and the relative positional relationship parameter of the at least two visualization instances.

The server can integrate the user setting parameter of each visualization instance of the at least two visualization instances and the relative positional relationship parameter of the at least two visualization instances to a configuration parameter of the to-be-generated customized visualization component.

The server can generate the customized visualization component based on the initial visualization component corresponding to each of the at least two visualization instances and the configuration parameter.

The server can send the customized visualization component to the terminal device, to facilitate using the customized visualization component by the user to create a data visualization report form.

In addition, the server can further store the customized visualization component to a preset component repository or database.

In some application scenarios, the user can further set, while combining the at least two visualization instances on the component editing page to generate a combination of visualization instances, a hierarchical relationship parameter of the at least two visualization instances among the combination of visualization instances. The hierarchical relationship parameter is also a parameter for configuring a relative positional relationship of a map layer corresponding to each of the at least two visualization instances. For example, the hierarchical relationship parameter is a parameter for instructing a map layer of a visualization instance being above a map layer of another visualization instance.

In these application scenarios, the determining the initial visualization component and the user setting parameter corresponding to each of the at least two visualization instances, and a relative positional relationship parameter of the at least two visualization instances in Step 402 further includes determining the hierarchical relationship parameter of the at least two visualization instances.

In these application scenarios, the creation request generated by the executive body further includes the hierarchical relationship parameter of the at least two visualization instances. That is, in these application scenarios, the creation request can include the identifier information of the initial visualization component and the user setting parameter corresponding to each of the at least two visualization instances, the relative positional relationship parameter of the at least two visualization instances, and the hierarchical relationship parameter of the at least two visualization instances.

In these application scenarios, in Step 403, the executive body can send the creation request including the identifier information of the initial visualization component and the user setting parameter corresponding to each of the at least two visualization instances, the relative positional relationship parameter of the at least two visualization instances, and the hierarchical relationship parameter of the at least two visualization instances to the server to enable the server to generate the customized visualization instances based on the identifier information of the initial visualization component and the user setting parameter corresponding to each of the at least two visualization instances, the relative positional relationship parameter of the at least two visualization instances, and the hierarchical relationship parameter of the at least two visualization instances.

In these application scenarios, the server can generate the configuration parameter corresponding to the to-be-generated customized visualization component based on the identifier information of the initial visualization component and the user setting parameter corresponding to each of the at least two visualization instances, the relative positional relationship parameter of the at least two visualization instances, and the hierarchical relationship parameter of the at least two visualization instances. The server can generate the customized visualization component based on the initial visualization component corresponding to each of the at least two visualization instances and the configuration parameter.

As can be seen from FIG. 4, compared with the embodiment corresponding to FIG. 2, the flow 400 of the method for generating a customized visualization component according to the embodiment highlights the visualization instance being a combination of visualization instances, and a process of generating the customized visualization component based on the combination of visualization instances. Therefore, the scheme described in the embodiment can generate more types of customized visualization components, thereby further contributing to saving the time spent by the user in generating a data visualization report form satisfying his demands and styles.

In some optional implementations, Step 201 in the embodiment shown in FIG. 2 and Step 401 in the embodiment shown in FIG. 4 of the present disclosure may include: sending, in response to receiving a creation instruction for instructing to create a customized visualization component, user identifier information corresponding to the creation instruction to the server to enable the server to authenticate the user; and determining, in response to receiving information for instructing successful authentication sent by the server, a visualization instance presented on a current component editing page based on the received creation instruction.

In these optional implementations, the user can have access to a data visual editing tool configured on the server using information indicating user identity, such as a user account. The executive body can generate user identifier information based on user information, such as the user account, and password.

The executive body for generating a customized visualization component can send, in response to receiving a creation instruction for instructing to create a customized visualization component, user identifier information corresponding to the creation instruction to the server to enable the server to authenticate the user.

In these optional implementations, the server can send, when determining the user being authenticated to create a customized visualization component, information for instructing successful authentication to the executive body. The server can send, when determining the user being not authenticated to create a customized visualization component, information for instructing authentication failure to the executive body.

The executive body can determine, in response to receiving information for instructing successful authentication sent by the server, a visualization instance presented on a current component editing page and corresponding to the creation instruction based on the received creation instruction.

In these optional implementations, the user needs to be authenticated, and only after the authentication is successful, can the customized visualization component be generated. By user authentication, security of the data visual editing tool can be improved.

Figure 5:
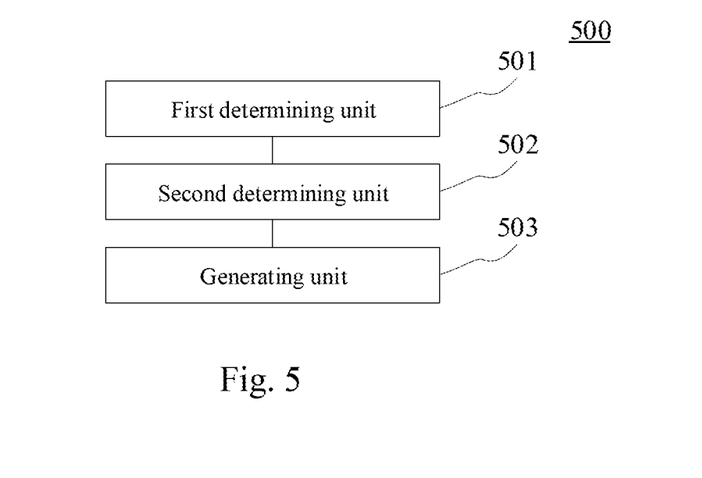
FIG. 5 is a structural schematic diagram of an embodiment of the apparatus for generating a customized visualization component according to the present disclosure.

Further referring to FIG. 5, as implementation of the method shown in the above figures, the present disclosure provides an embodiment of an apparatus for generating a customized visualization component. The embodiment of the apparatus corresponds to the embodiment of the method shown in FIG. 2, and the apparatus can be specifically used in various electronic devices.

As shown in FIG. 5, the apparatus 500 for generating a customized visualization component according to the embodiment includes: a first determining unit 501, a second determining unit 502, and a generating unit 503. The first determining unit 501 is configured for determining, in response to receiving a creation instruction for instructing to create a customized visualization component, a visualization instance presented on a current component editing page based on the received creation instruction; the second determining unit 502 is configured for determining an initial visualization component corresponding to the visualization instance and a user setting parameter set by a user for the visualization instance; and the generating unit 503 is configured for uploading a creation request for the customized visualization component to a server to enable the server to generate the customized visualization component based on the initial visualization component and the user setting parameter, the creation request including identifier information of the initial visualization component and the user setting parameter.

Specific processing of the first determining unit 501, the second determining unit 502, and the generating unit 503 of the apparatus 500 for generating a customized visualization component in the embodiment and technical effects brought thereby may be respectively referred to in relevant description of the steps 201, 202, and 203 in the embodiment corresponding to FIG. 2, and is not repeated any more here.

In some optional implementations of the embodiment, the visualization instance is a combination of visualization instances, the combination of visualization instances is formed by combining at least two visualization instances, each of the visualization instances corresponds to an initial visualization component; the second determining unit 502 is further configured for: determining a relative positional relationship parameter of the at least two visualization instances; the creation request includes the identifier information of the initial visualization component and the user setting parameter corresponding to each of the at least two visualization instances, and the relative positional relationship parameter; and the generating unit is further configured for: uploading the creation request to the server to enable the server to generate the customized visualization component based on the identifier information of the initial visualization component and the user setting parameter corresponding to each of the at least two visualization instances, and the relative positional relationship parameter.

In some optional implementations of the embodiment, the second determining unit 502 is further configured for: determining a hierarchical relationship parameter of the at least two visualization instances; the creation request further includes the hierarchical relationship parameter; and the generating unit is further configured for: uploading the creation request to the server to enable the server to generate the customized visualization component based on the identifier information of the initial visualization component and the user setting parameter corresponding to each of the at least two visualization instances, the relative positional relationship parameter, and the hierarchical relationship parameter.

In some optional implementations of the embodiment, the apparatus 500 for generating a customized visualization component further includes: a receiving unit (not shown in the figure) configured for: receiving the customized visualization component created based on the creation request and sent by the server and the identifier information thereof; and presenting the customized visualization component in a component list displayed on the component editing page.

In some optional implementations of the embodiment, the apparatus 500 for generating a customized visualization component can further include a sharing unit (not shown in the figure) configured for: sending, in response to receiving a sharing operation of a user on the customized visualization component, the sharing operation to the server to enable the server to share the customized visualization component to users instructed by the sharing operation.

In some optional implementations of the embodiment, the apparatus 500 for generating a customized visualization component can further includes an authenticating unit (not shown in the figure) configured for: sending, in response to receiving the creation instruction for instructing to create the customized visualization component, user identifier information corresponding to the creation instruction to the server to enable the server to authenticate the user; and determining, in response to receiving information for instructing successful authentication sent by the server, the visualization instance presented on a current component editing page based on the received creation instruction.

Figure 6:
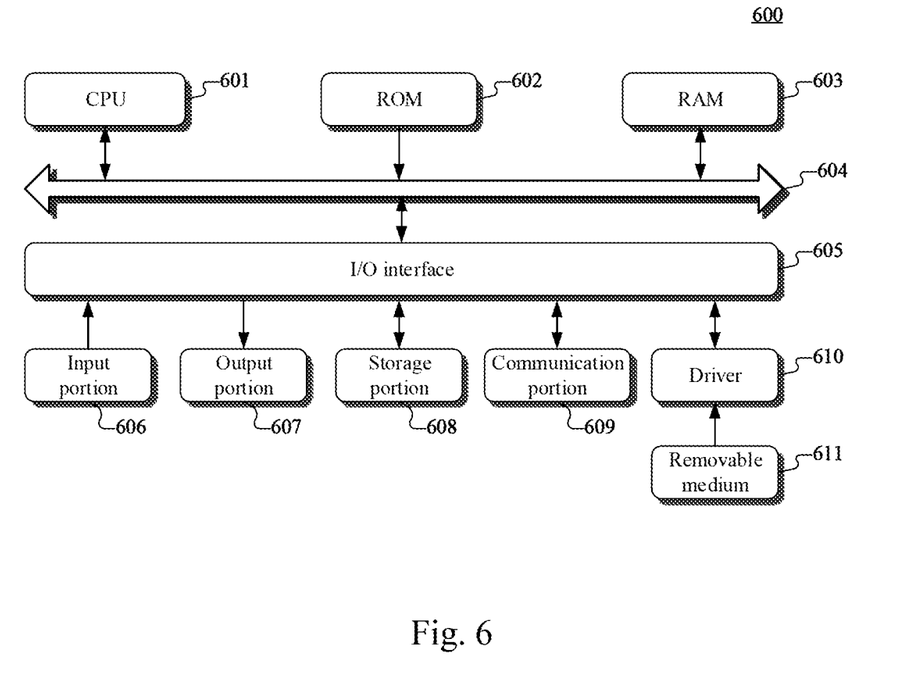
FIG. 6 is a structural schematic diagram of a computer system adapted to implement an electronic device according to an embodiment of the present disclosure.

Referring to FIG. 6, a schematic structural diagram of a computer system 600 adapted to implement an electronic device of the embodiments of the present disclosure is shown. The electronic device shown in FIG. 6 is merely an example, and should not limit the function and scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse, or the like; an output portion 607 including a cathode ray tube (CRT), a liquid crystal display device (LCD), a speaker, or the like; a storage portion 608 including a hard disk or the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, so that a computer program read therefrom is installed on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program includes program codes for executing the method as illustrated in the flow chart. In such an embodiment, the computer program may be downloaded and installed from a network via the communication portion 609, and/or may be installed from the removable medium 611. The computer program, when executed by the CPU 601, implements the functions as defined by the methods of the present disclosure. It should be noted that the computer readable medium in the present disclosure may be computer readable signal medium or computer readable storage medium or any combination of the above two. An example of the computer readable storage medium may include, but is not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any tangible medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including a first determining unit, a second determining unit, and a generating unit. Here, the names of these units do not in some cases constitute a limitation to such units themselves.

For example, the first determining unit may also be described as "a unit configured to determine, in response to receiving a creation instruction for instructing to create a customized visualization component, a visualization instance presented on a current component editing page based on the received creation instruction."

In another aspect, the present disclosure further provides a computer-readable medium. The computer-readable storage medium may be included in the apparatus in the above described embodiments, or a stand-alone computer-readable medium not assembled into the apparatus. The computer-readable medium stores one or more programs. The one or more programs, when executed by the apparatus, cause the apparatus to: determining, in response to receiving a creation instruction for instructing to create a customized visualization component, a visualization instance presented on a current component editing page based on the received creation instruction; determining an initial visualization component corresponding to the visualization instance and a user setting parameter set by a user for the visualization instance; and uploading a creation request for the customized visualization component to a server to enable the server to generate the customized visualization component based on the initial visualization component and the user setting parameter, the creation request comprising identifier information of the initial visualization component and the user setting parameter.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for generating a customized visualization component, comprising:
　　determining, in response to receiving a creation instruction for instructing to create a customized visualization component, a visualization instance presented on a current component editing page based on the received creation instruction, wherein the visualization instance is a combination of visualization instances, the combination of visualization instances is formed by combining at least two visualization instances, and each of the at least two visualization instances corresponds to an initial visualization component;
　　determining the initial visualization component corresponding to each of the at least two visualization instances and a user setting parameter set by a user for each of the at least two visualization instances, and a relative positional relationship parameter and a hierarchical relationship parameter of the at least two visualization instances, wherein the user setting parameter comprises attributes of each of the at least two visualization instances, the relative positional relationship parameter indicates a relative positional relationship of the at least two visualization component instances, and the hierarchical relationship parameter indicates a visual mapping of the at least two visualization component instances in a hierarchical relationship;

uploading a creation request for the customized visualization component to a server to enable the server to generate the customized visualization component based on the initial visualization component and the user setting parameter corresponding to each of the at least two visualization instances, the relative positional relationship parameter, and the hierarchical relationship parameter, the creation request comprising identifier information of the initial visualization component and the user setting parameter corresponding to each of the at least two visualization instances, and the relative positional relationship parameter and the hierarchical relationship parameter; and receiving the customized visualization component created by the server based on the creation request and identifier information of the customized visualization component from the server.

2. The method according to claim 1, further comprising:

sending, in response to receiving the creation instruction for instructing to create the customized visualization component, user identifier information corresponding to the creation instruction to the server to enable the server to authenticate the user; and determining, in response to receiving information for instructing successful authentication sent by the server, the visualization instance presented on the current component editing page based on the received creation instruction.

3. The method according to claim 1, further comprising:

presenting the customized visualization component in a component list displayed on the component editing page.

4. The method according to claim 3, further comprising:

sending, in response to receiving a sharing operation of a user on the customized visualization component, the sharing operation to the server to enable the server to share the customized visualization component to users instructed by the sharing operation.

5. An apparatus for generating a customized visualization component, comprising:

at least one processor; and a memory storing instructions, the instructions when executed by the at least one processor, cause the at least one processor to perform operations, the operations comprising:

determining, in response to receiving a creation instruction for instructing to create a customized visualization component, a visualization instance presented on a current component editing page based on the received creation instruction, wherein the visualization instance is a combination of visualization instances, the combination of visualization instances is formed by combining at least two visualization instances, and each of the at least two visualization instances corresponds to an initial visualization component;

determining the initial visualization component corresponding to each of the at least two visualization instances and a user setting parameter set by a user for each of the at least two visualization instances, and a relative positional relationship parameter and a hierarchical relationship parameter of the at least two visualization instances, wherein the user setting parameter comprises attributes of each of the at least two visualization instances, the relative positional relationship parameter indicates a relative positional relationship of the at least two visualization component instances, and the hierarchical relationship parameter indicates a visual mapping of the at least two visualization component instances in a hierarchical relationship;

uploading a creation request for the customized visualization component to a server to enable the server to generate the customized visualization component based on the initial visualization component and the user setting parameter corresponding to each of the at least two visualization instances, the relative positional relationship parameter, and the hierarchical relationship parameter, the creation request comprising identifier information of the initial visualization component and the user setting parameter corresponding to each of the at least two visualization instances, and the relative positional relationship parameter and the hierarchical relationship parameter; and receiving the customized visualization component created by the server based on the creation request and identifier information of the customized visualization component from the server.

6. The apparatus according to claim 5, the operations further comprising:

sending, in response to receiving the creation instruction for instructing to create the customized visualization component, user identifier information corresponding to the creation instruction to the server to enable the server to authenticate the user; and determining, in response to receiving information for instructing successful authentication sent by the server, the visualization instance presented on the current component editing page based on the received creation instruction.

7. The apparatus according to claim 5, the operations further comprising:

presenting the customized visualization component in a component list displayed on the component editing page.

8. The apparatus according to claim 7, the operations further comprising:

sending, in response to receiving a sharing operation of a user on the customized visualization component, the sharing operation to the server to enable the server to share the customized visualization component to users instructed by the sharing operation.

9. A non-transitory computer readable medium, storing a computer program therein, wherein the computer program, when executed by a processor, causes the processor to perform operations, the operations comprising:

determining, in response to receiving a creation instruction for instructing to create a customized visualization component, a visualization instance presented on a current component editing page based on the received creation instruction, wherein the visualization instance is a combination of visualization instances, the combination of visualization instances is formed by combining at least two visualization instances, and each of the at least two visualization instances corresponds to an initial visualization component;

determining the initial visualization component corresponding to each of the at least two visualization instances and a user setting parameter set by a user for each of the at least two visualization instances, and a relative positional relationship parameter and a hierarchical relationship parameter of the at least two visualization instances, wherein the user setting parameter comprises attributes of each of the at least two visualization instances, the relative positional relationship parameter indicates a relative positional relationship of the at least two visualization component instances, and the hierarchical relationship parameter indicates a visual mapping of the at least two visualization component instances in a hierarchical relationship;

uploading a creation request for the customized visualization component to a server to enable the server to generate the customized visualization component based on the initial visualization component and the user setting parameter corresponding to each of the at least two visualization instances, the relative positional relationship parameter, and the hierarchical relationship parameter, the creation request comprising identifier information of the initial visualization component and the user setting parameter corresponding to each of the at least two visualization instances, the relative positional relationship parameter, and the hierarchical relationship parameter; and receiving the customized visualization component created by the server based on the creation request and identifier information of the customized visualization component from the server.

* * * * *